US008978320B2

(12) United States Patent
Johnson

(10) Patent No.: US 8,978,320 B2
(45) Date of Patent: Mar. 17, 2015

(54) TEMPORARY STORAGE SYSTEM FOR AGRICULTURAL PRODUCTS

(71) Applicant: Howard S. Johnson, Battle Creek, MI (US)

(72) Inventor: Howard S. Johnson, Battle Creek, MI (US)

(73) Assignee: The GSI Group, LLC, Assumption, IL (US)

( * ) Notice: Subject to any disclaimer, the term of this patent is extended or adjusted under 35 U.S.C. 154(b) by 0 days.

(21) Appl. No.: 13/856,045

(22) Filed: Apr. 3, 2013

(65) Prior Publication Data
US 2013/0263528 A1   Oct. 10, 2013

Related U.S. Application Data

(60) Provisional application No. 61/620,011, filed on Apr. 4, 2012.

(51) Int. Cl.
 E04H 5/08   (2006.01)
(52) U.S. Cl.
 CPC ....................................... *E04H 5/08* (2013.01)
 USPC ......................................................... 52/79.9
(58) Field of Classification Search
 CPC ............... E04H 5/08; E04H 7/22; E04H 7/24; E04H 7/30; E04H 7/14; E04H 7/18; A01F 12/60; A01F 25/04; A01F 25/08; A01F 25/10; A01F 25/147; A01F 25/16; A01F 25/22; A01F 25/166; A01F 25/163; B65G 3/02; B65G 3/04

USPC ........ 52/64, 79.1, 79.3, 79.5, 79.9, 79.12, 82, 52/102, 146, 152, 202, 245, 247, 249, 52/302.3, 519, 537, 545, 546, 547; 256/12.5, 30, 31, 64
See application file for complete search history.

(56) References Cited

U.S. PATENT DOCUMENTS

| | | | |
|---|---|---|---|
| 252,168 A | 1/1882 | Angus | |
| 440,369 A * | 11/1890 | Saucerman | 119/449 |
| 2,305,856 A * | 12/1942 | Fees | 52/192 |
| 2,874,651 A | 2/1959 | Peterson | |
| 3,015,373 A | 1/1962 | MacMillan, Jr. et al. | |
| 3,193,973 A | 7/1965 | Lee et al. | |
| 3,857,210 A | 12/1974 | Austin | |
| 3,982,360 A | 9/1976 | Newman | |
| 3,999,348 A | 12/1976 | Hicks | |
| 4,137,682 A * | 2/1979 | Trumper | 52/302.3 |
| 4,364,205 A | 12/1982 | Scott | |
| 4,433,522 A * | 2/1984 | Yerushalmi | 52/426 |
| 4,502,369 A * | 3/1985 | Aldag | 454/180 |
| 4,503,646 A | 3/1985 | Lowe | |
| 4,627,333 A * | 12/1986 | Anderson et al. | 454/178 |
| 4,660,337 A | 4/1987 | Ross, III et al. | |
| 4,867,046 A | 9/1989 | Yoder | |
| 4,912,886 A | 4/1990 | Jannin | |
| 5,222,325 A | 6/1993 | Angus | |
| 5,862,637 A * | 1/1999 | Bruce | 52/147 |
| 2003/0009959 A1* | 1/2003 | Bruce | 52/146 |
| 2003/0131552 A1* | 7/2003 | Leichtfried | 52/543 |

* cited by examiner

*Primary Examiner* — Jessica Laux

(57) ABSTRACT

Disclosed herein are apparatus and systems for forming a temporary storage facility for granular materials such as agricultural products including grain and corn. The temporary storage facility includes a retaining wall constructed by connecting free-standing wall sections in a circular or rectangular shape. The free-standing wall sections have overlapping elements on the face to hold the agricultural products inside the retaining wall sections while admitting air for ventilation. Ventilation holes are made in the panel elements so as to admit air but prevent water or vermin entry to protect the agricultural products.

6 Claims, 7 Drawing Sheets

TEMPORARY STORAGE SYSTEM FOR AGRICULTURAL PRODUCTS

CROSS-REFERENCE TO RELATED APPLICATIONS

This application claims the benefit of U.S. Provisional Application No. 61/620,011, filed Apr. 4, 2012.

TECHNICAL FIELD

The present invention relates to temporary storage systems used to store agricultural products such as grain.

BACKGROUND

Storage of large volumes of granular materials, including agricultural products such as wheat, corn or barley can benefit from the use of temporary structures. Agricultural endeavors in particular, due to vagaries in the size and timing of harvested crops, market conditions and weather, can benefit from storage facilities which protect crops while allowing easy filling of the structure using conventional handling equipment and permitting portions of the harvested crops to be easily withdrawn on variable schedules. Due to the highly variable nature of the factors which produce the need for storage, it can be very inefficient to build permanent structures large enough to contain the largest possible crop for the maximum time period desired.

In addition to being cost effective to erect and maintain, it is desirable for temporary structures for agricultural products to allow the crops stored therein to be ventilated by air circulation to permit drying to optimal levels to maximize the market price of the crops and to prevent rot.

Grains are often stored in permanent, fixed structures such as silos and similar metal or wood structures. Such structures are, by their nature, fixed and somewhat costly to erect. It is known to provide temporary storage facilities of the general type herein described, which are cost-effective to prepare and utilize, may be easily dismantled and transported, which at the same time providing effective temporary storage during a typical harvest season.

Temporary storage facilities of the type herein described utilize a base, a retaining wall, a ventilating system, and a cover.

A base for temporary storage facilities is typically a prepared surface, often circular, oval or rectangular. The surface may be an inert aggregate material or an asphalt material.

The retaining wall is typically constructed of several perforated wall panels, the perforations being numerous and uniform in size, and having a dimension smaller than the typical dimension of the agricultural grain to be stored within the perimeter formed by the retaining wall. The retaining wall sections are supported at an angle in relation to vertical, and provided with the necessary reinforcement to carry the loads imposed by the material being stored within the facility. Typically, the retaining wall sections are connected in an end to end fashion providing a substantially contiguous barrier surrounding the perimeter of the storage surface.

To retard spoilage and protect the stored product, the typical temporary storage facility of the type herein described requires positive ventilation. This is accomplished by placement of numerous perforated conduits on the storage surface. Such conduits are typically sealed at one end, perforated both longitudinally and circumferentially, routed through openings formed in the retaining walls, and then connected to one or more blowers which draw air from the ventilating conduits. This action lowers the pressure in the grain pile, thereby drawing air from the perimeter of the storage structure, through the retaining walls, and into the base of the grain pile. The typical covering for the temporary storage facility of the type described herein is sometimes a flexible material in the form of a sturdy but lightweight plastic film. In other installations, the cover is formed from a plurality of wedge-shaped plastic elements which are secured together to form a conical top enclosure for the grain pile.

Principal drawbacks of the present systems include the complexity and costs associated with the formation of perforated panels for the wall sections, the need to consider the dimensions of the perforations in relation to the grain being stored, and the susceptibility of the perforated panels to clogging. Attempts have been made to utilize screens as a portion of the wall panels, but both heavily perforated sheets and screens lack the rigidity required to support the loads imposed by the grain being stored in a facility.

The present invention addresses these limitations by providing a rigid support panel which is simple and inexpensive to manufacture, and which optimizes the flow of ventilating air through the supporting wall. Panels constructed according to the present invention are inherently strong by virtue of their cross-sectional shape, requiring fewer structural supports for maintaining the wall sections in the desired position, i.e., retaining the loads imposed by the material being contained.

SUMMARY

Disclosed embodiments include methods, apparatuses and systems for temporary storage of agricultural grain products including an enclosing retaining wall having a plurality of free-standing sections. The enclosing retaining wall can include multiple free-standing sections arranged in a circular, oval or substantially rectangular shape. The free-standing sections are typically constructed of galvanized steel and include ground supports which permit the free-standing sections to maintain a predetermined angle based on the angle of repose of the agricultural products stored. The free-standing sections include perforated wall panels which permit ventilation. Adjacent free-standing sections can be held together by short sections of louvered panels. The free-standing sections optionally include openings for accommodation of ventilating pipes for directing ventilating air through the agricultural products.

BRIEF DESCRIPTION OF THE DRAWINGS

The various features, advantages and other uses of the present apparatus will become more apparent by referring to the following detailed description and drawing in which.

DETAILED DESCRIPTION

The present invention will be best understood by reference to FIGS. 1-7 and the elements appropriately numbered thereon.

Figure 1:
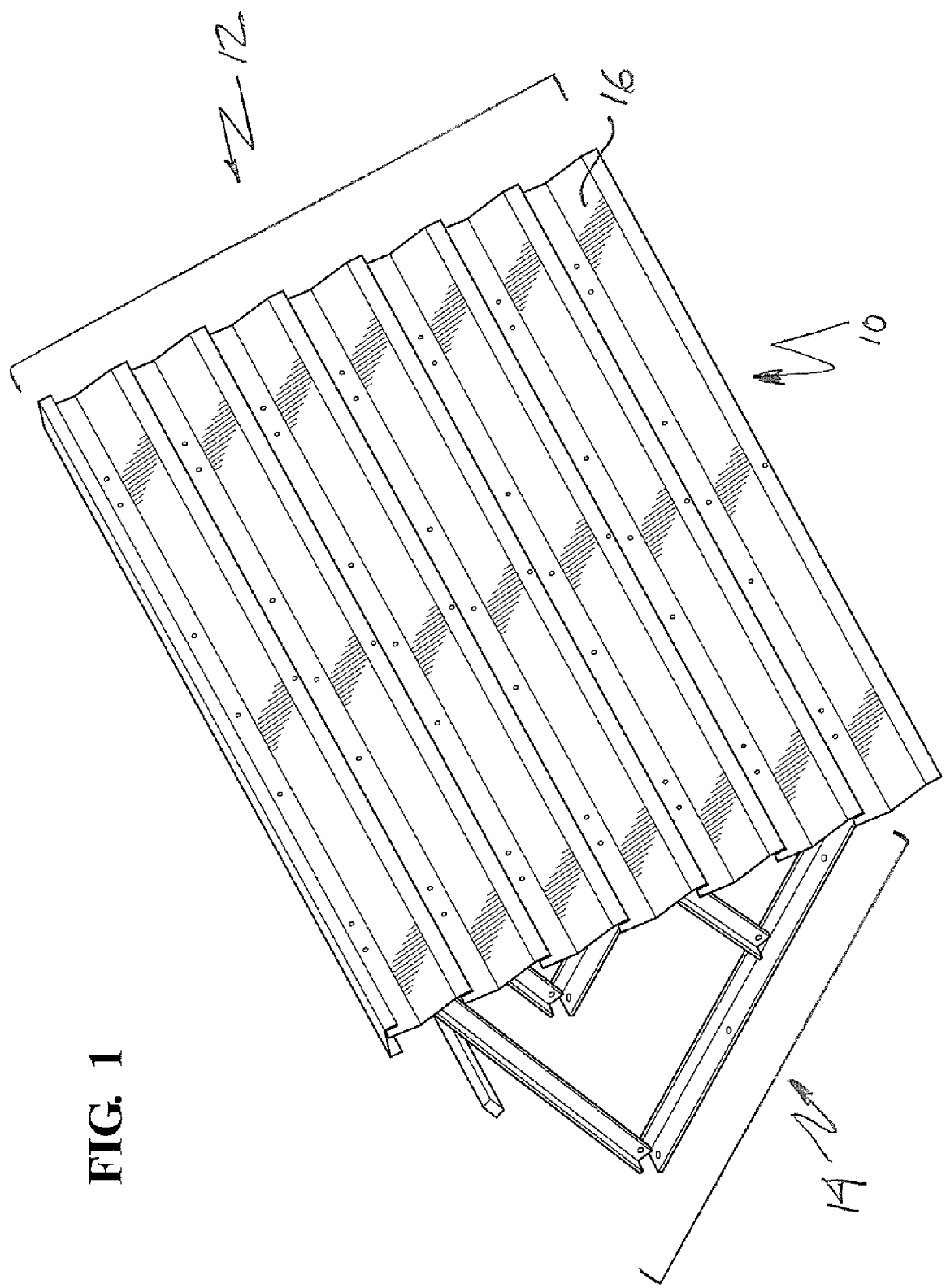
FIG. 1 is a perspective view showing a free-standing wall section assembly according to the disclosed embodiments.

With reference first to FIG. 1, the details of the wall sections 10 will best be appreciated. As shown in all of the accompanying figures, a plurality of wall sections 10 is interconnected to form a retaining wall which may be round, oval, elliptical or approximately rectangular in shape when viewed in plan. Such a perimeter is designed to surround and retain a quantity of granular material as will be further explained herein.

Each wall section 10 is, as depicted in FIG. 1, a collection of elements forming a panel assembly 12 and a support structure 14. The panel assembly 12 is further comprised of a plurality of overlapping elements 16 which, when interconnected and connected to a supporting sub-structure, form a barrier for enclosing the granular material above-referenced.

Figure 2:
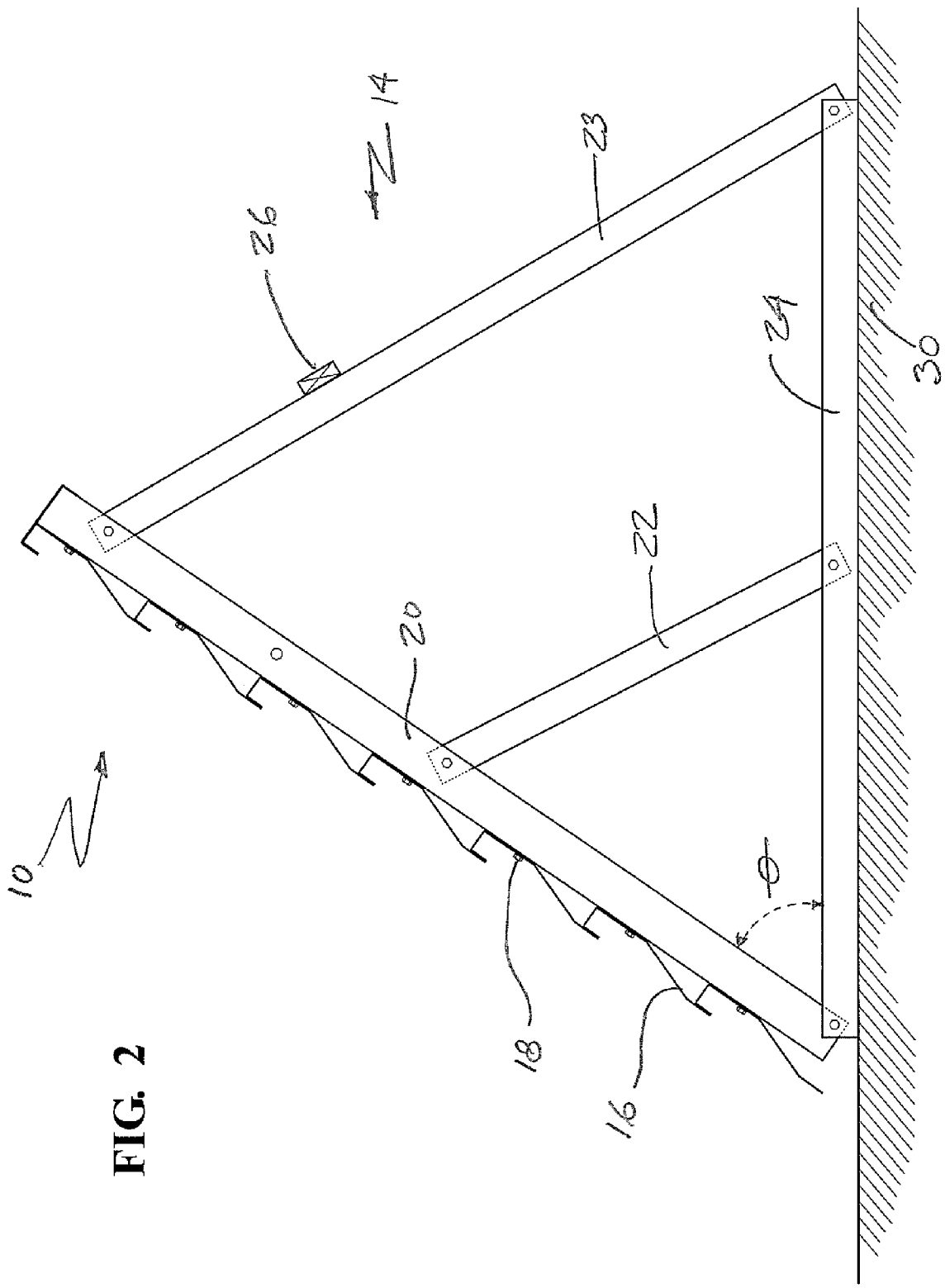
FIG. 2 is a side view showing a free-standing wall section assembly according to the disclosed embodiments.

With reference to FIGS. 1 and 2, it will be appreciated that the elements 16 are secured by fasteners 18 to a plurality of back supports 20 using fasteners 18. Elements 16 are preferably formed of a high strength rigid material such as galvanized steel, although other materials, such as aluminum or fiberglass reinforced plastics may serve as suitable substitutes. In a typical panel assembly 12, elements 16 are of uniform length, conventionally between 3 feet and 12 feet in length. Each panel element 16 measures approximately 14 inches in height, although this dimension may be varied, as needed, to provide the necessary rigidity to the panel assembly 12 and wall section 10 to accommodate the loads imposed by the volume of material being retained by the plurality of wall sections 10 forming the retaining wall surrounding the stored material. The number of panel elements 16 is selected based on the desired finished height of the completed wall section 10, which is a function of the anticipated height of the perimeter of the granular material being stored within the completed structure. Likewise, the length of back supports 20 will be selected to provide the necessary support for and engagement with the plurality of elements 16 forming the panel assembly 12.

With particular attention now to FIG. 2, each wall section 10 incorporates a support structure 14 comprising a plurality of bases 24, long braces 23, short braces 22 and back supports 20 which are interconnected in a triangular configuration by fasteners 18, and supported on the ground or other surface 30. A portion of base 24, short brace 22 and back support 20 forms a triangular structure, as do the entire base 24, back support 20 and long brace 23, thereby providing the necessary structural support for each wall section 10. In a typical embodiment, each wall section 10 is supported by a plurality of support structures 14 spaced along the back side of panel assembly 12.

The back support 20, base 24, long brace 23 and short brace 22 elements as depicted in FIG. 2 may be provided with pre-drilled or pre-tapped holes designed to engage fasteners 18, which are preferably threaded fasteners in the form of cap screws. A wide variety of similar fasteners which will be well known to those skilled in the art may likewise be used to accomplish interconnection of the individual elements of the support structure above-described. In the preferred embodiment, a span brace 26 interconnects the long braces 23 associated with each panel assembly 12 to provide additional lateral rigidity to each support structure 14 associated with each wall section 10. Preferably, long braces 23, short braces 22, bases 24 and back supports 20 are formed of durable rigid material such as galvanized steel having an L cross section, although it will be appreciated that other metals, such as aluminum, or plastics, such as fiberglass reinforced plastic, may be selected as the raw material for the support structures as well. Span braces 26 are preferably 2"×4" wood boards, although other materials and dimensions will also suffice.

In the preferred embodiment, the panel assembly 12 comprising a plurality of elements 16 and back supports 20 is disposed at a predetermined angle ° to the ground where ° is typically 55 degrees, more or less, this angle having been selected to optimize the position of the grain in relation to the elements 16, as will be further described herein.

Figure 3:
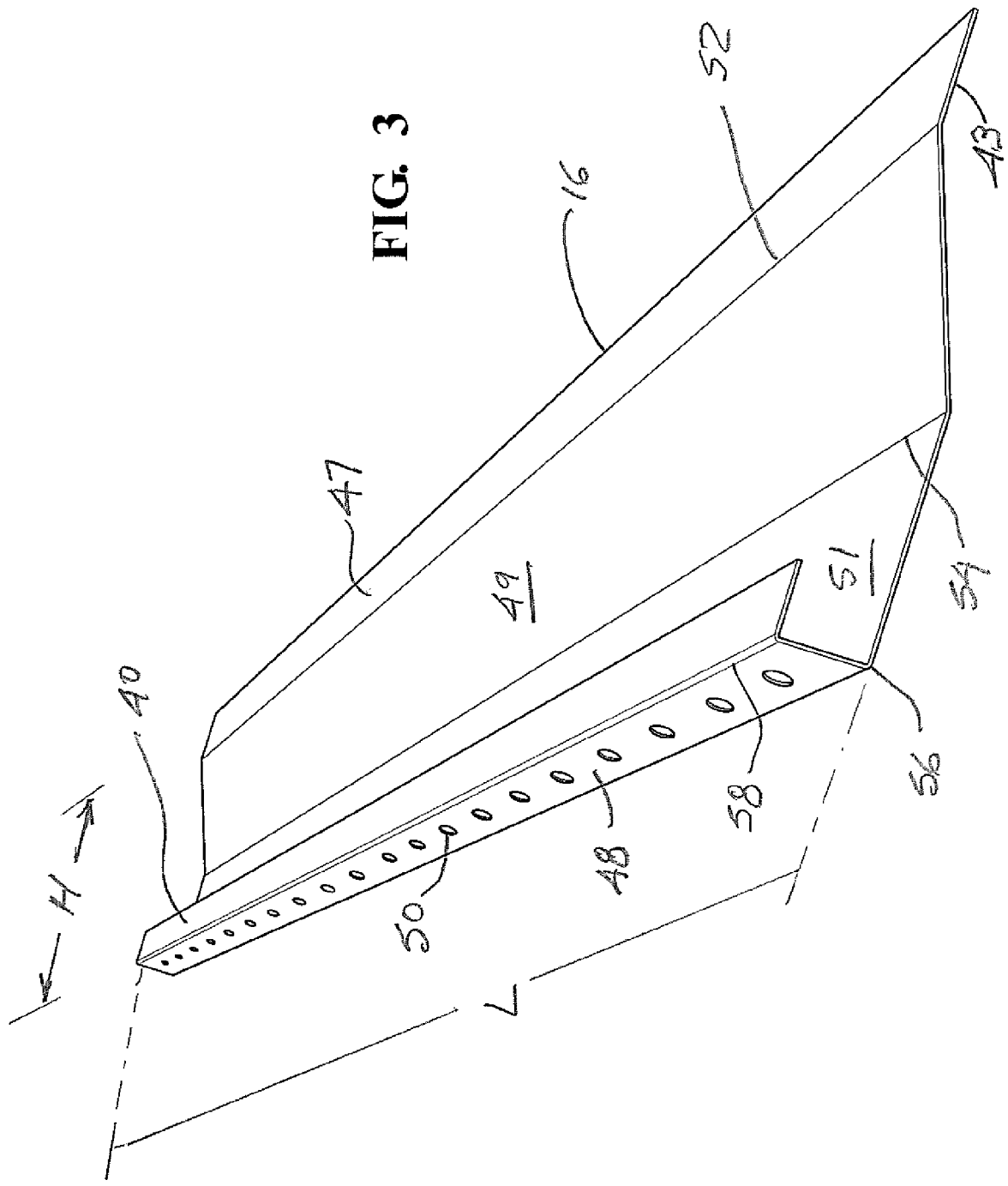
FIG. 3 is a diagram showing a single wall section element according to the disclosed embodiments.

With reference now to FIG. 2 and FIG. 3, the detailed configuration of the individual elements 16 will be appreciated. Each element 16 is elongate, having a length L selected according to the desired length of the panel assembly. Likewise, each element 16 has a height H selected to attain a desired overall height of the panel assembly 12. Each element 16 is formed, either by folding or by extrusion, to present an approximately "J" cross-section. Each element 16 is provided with a plurality of mounting holes 60 designed to facilitate engagement of element 16 with back support 20 as previously described, and as described below. Each element 16 is formed from flat stock, to which is applied a first fold 52, a second fold 54, a third fold 56 and a fourth fold 58. First fold 52 defines an essentially rectangular overlap 47 and center section 49. Second fold 54 and third fold 56 define a second section 51. Third fold 56 and fourth fold 58 define upper perforated surface 48 and upper exterior surface 40. Upper perforated surface 48 is provided with a plurality of perforations 50 which are formed in upper perforated surface 48 by conventional means, such as punching or drilling. Collectively, the folds add strength and rigidity to the element 16 and the panel assembly 12.

The total area occupied by perforations 50 is critical in terms of its relationship with the overall area of the upper perforated surface 48. Ideally, the diameter of perforations 50 is selected to be of sufficiently size as to optimize ventilation, while still maintaining a sufficient total surface area of all of the perforations 50 in relation to upper perforated surface 48 so that the perforations 50 occupy 12 to 13 percent of the upper perforated surface 48 of each element 16. Typically, each perforation is 0.75 inches in diameter.

Figure 4:
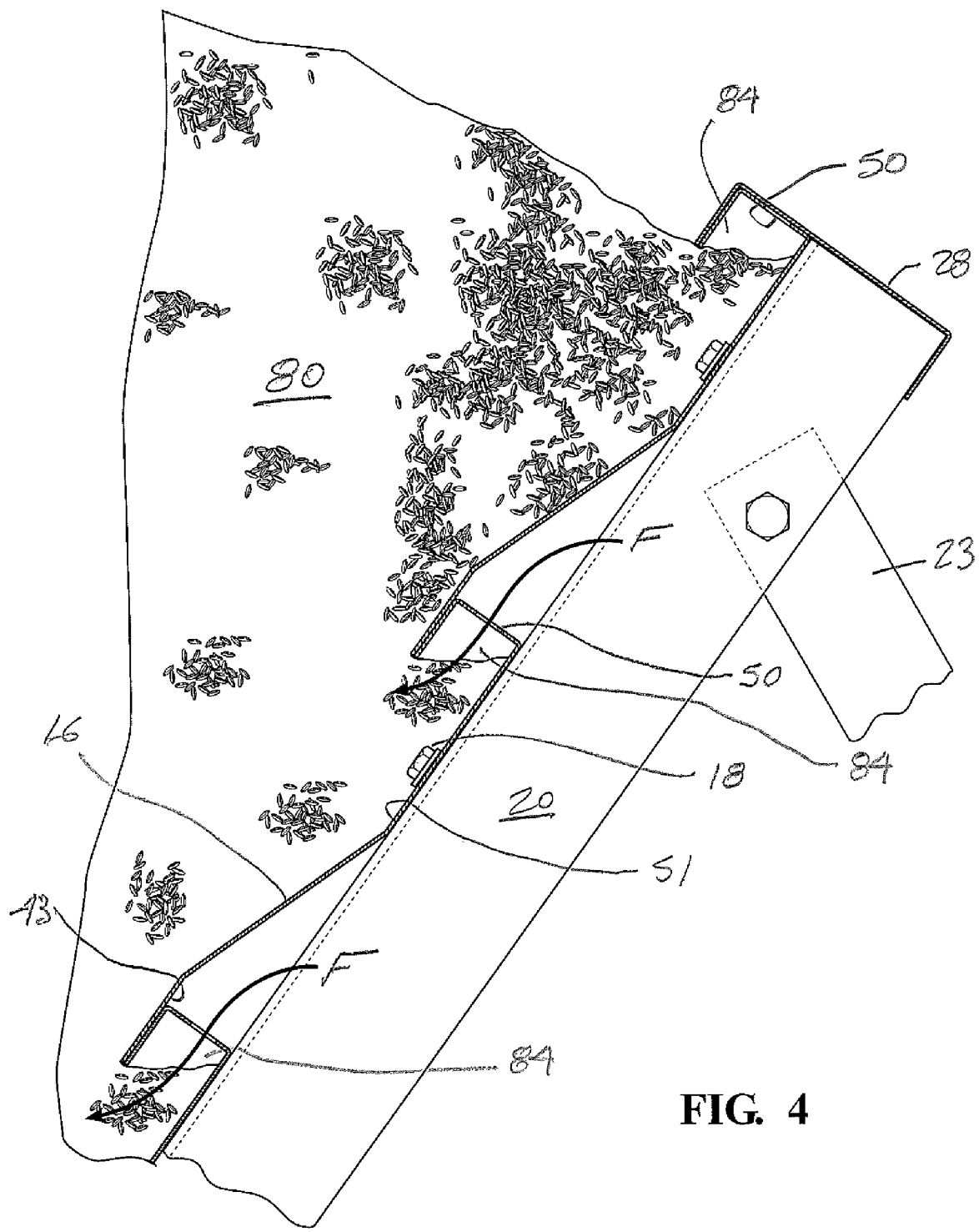
FIG. 4 is a detailed cross-sectional view of a portion of a wall section assembly.

With reference now to FIG. 3 and FIG. 4, the attachment of elements 16 to back supports 20 will be best understood, as will the interrelationship between adjoining elements 16. Each element 16 is secured to a plurality of back supports 20 so that each element 16 is substantially perpendicular to each back support 20. In use, therefore, the elements 16 are substantially horizontal, or, stated differently, positioned substantially parallel to the surface on which the wall sections 10 are positioned. Utilizing fasteners 18 of the type above-described, each element 16 is secured to each back support 20, with the understanding that the position of fasteners 18 is selected in relation to second section 51 so that the tools utilized for fixation of fasteners 18 may access the head of fasteners 18 as the elements 16 are secured to and assembled with the back supports 20. Each element 16 overlaps adjacent elements 16 which are positioned in parallel relationship to one another. As will be appreciated by reference to FIG. 4, the lower interior surface 43 of each element 16 is configured so as to overlap the upper exterior surface 40 of the adjoining elements 16.

When so assembled, the overlapping elements 16 create a path for the flow of air as depicted in drawings by the arrows designated by the letter "F". Air flows from the exterior of the support structure 14 and through the panel assembly 12 as depicted through perforations 50 and into the granular material 80 reposing against the panel assembly 12. In practice, the angular positioning of panel assembly 12 results in the formation of air pockets 84 at the upper end of each elements 16, thereby facilitating the flow of air, not only through perforations 50, but longitudinally along the length of each element 16 through air pockets 84. In the preferred embodiment, the uppermost element 16 is fitted with a cap 28 which blocks the perforations 50 in the uppermost element 16, thereby preventing the ingress of water or contaminants into the uppermost pocket 84 of each panel assembly 12.

Figure 5:
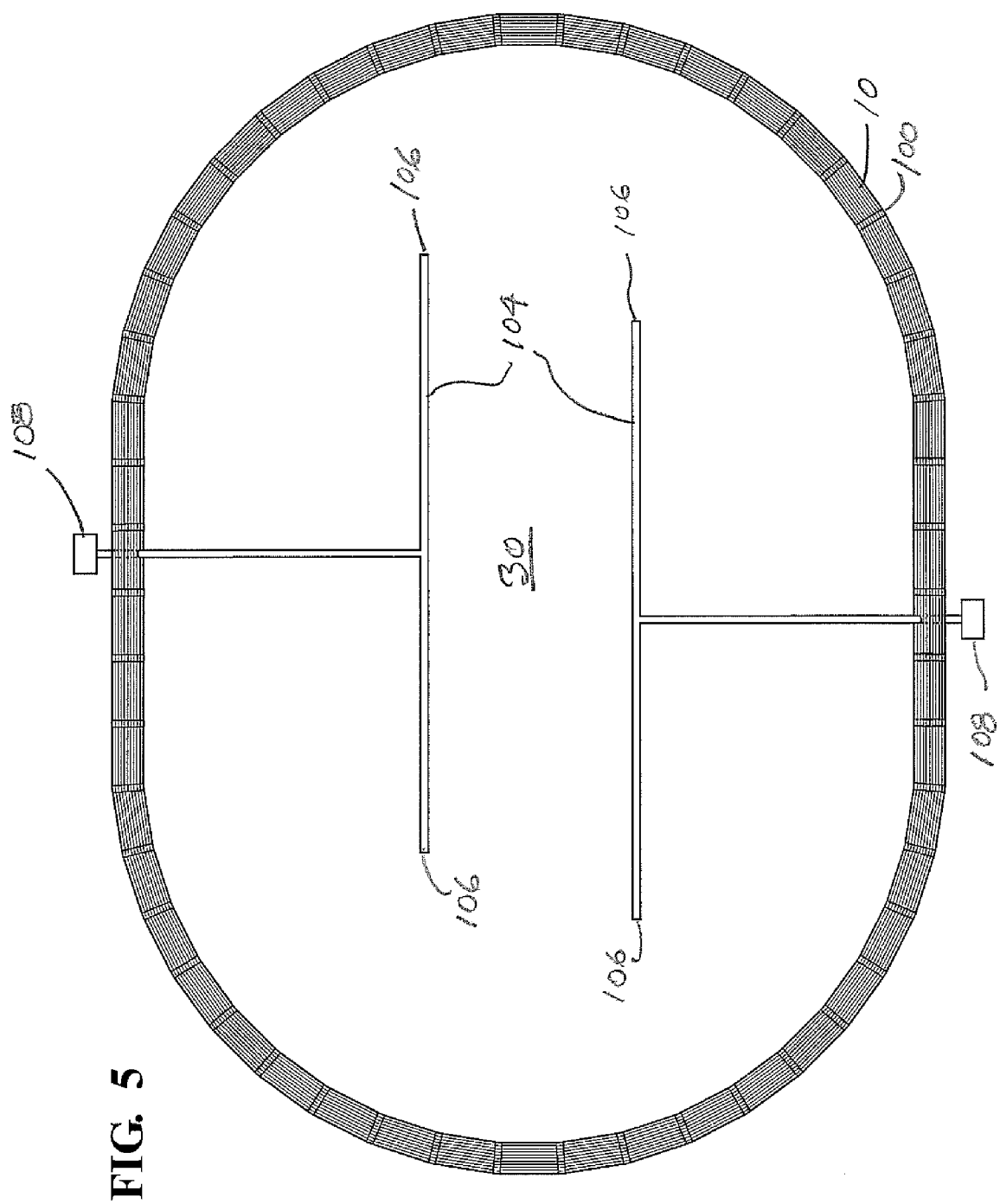
FIG. 5 is a top view of a storage facility showing multiple wall sections creating a wall assembly according to the disclosed embodiments.
Figure 6:
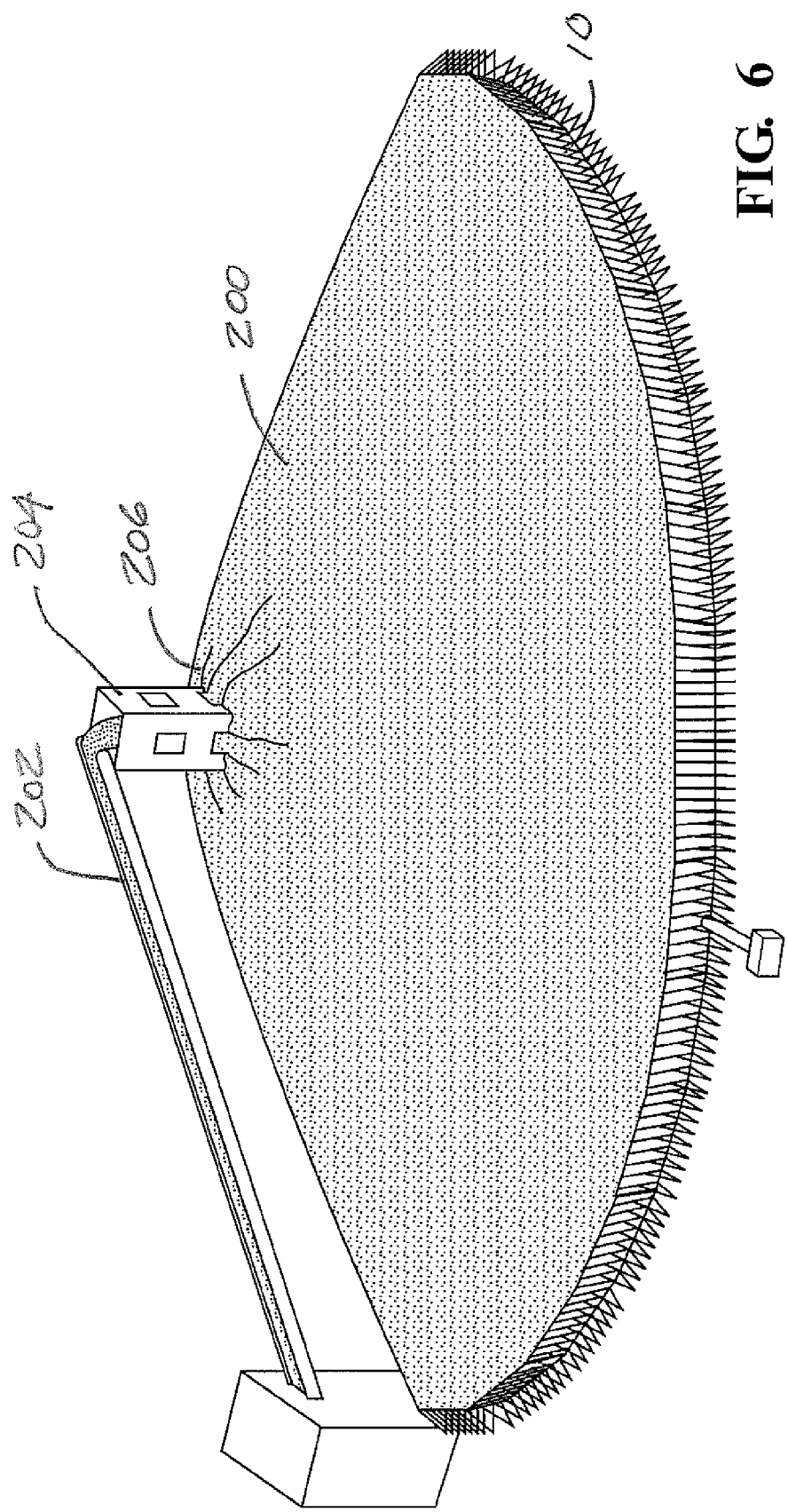
FIG. 6 is a perspective view showing a grain storage facility comprising a plurality of interconnected wall sections of the type described herein, surrounding and retaining a grain mound.
Figure 7:
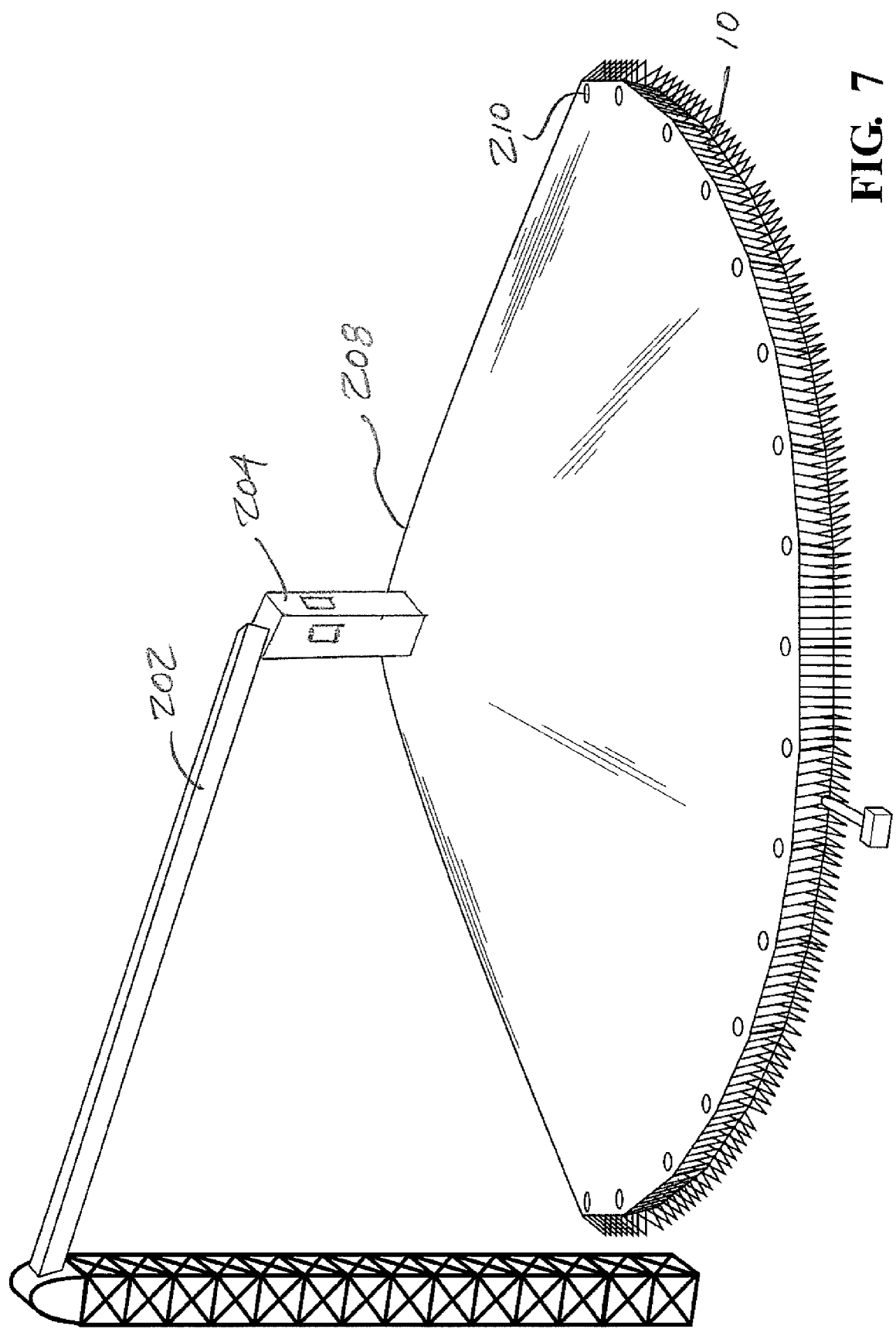
FIG. 7 is a perspective view showing a grain storage facility comprising a plurality of interconnected wall sections of the type described herein, surrounding and retaining a grain mound, and further incorporating a removable protective cover.

The implementation of the present invention is depicted in FIGS. 5, 6 and 7. With reference first to FIG. 5, an open area for construction of a temporary grain storage facility utilizing the present invention is depicted as an oval area having a perimeter 102 surrounded by a plurality of interconnected wall sections 10 interconnected by adjoining panels 100. Positioned on the ground 30 are one or more vent pipes 104 which are capped at their distal ends 106. Typically, the vent pipes are flexible, rigid or semi-rigid perforated pipes, communicating with a plurality of blowers 108. While the vent pipes 104 may be configured as depicted in FIG. 5, it is also known to utilize a spoke-like configuration for the pipes, with each "spoke" connected to and communicating with its own blower (not shown). The vent pipes 104 so configured provide an exhaust system for drawing air from the atmosphere surrounding the grain mound, through the mound and exhausting that air from an exhaust on the blower 108. This principle is diagrammatically depicted in FIG. 6, which shows a mound 200 of grain surrounded by a plurality of wall sections 10. The mound typically has an apex 206 located approximately centrally around a discharge tower 204 which is supported by and communicates with a loading structure 202. In use, granular material such as grain is routed through the loading structure 202 to the tower 204 where it is discharged into the center of the storage area forming mound 200.

Most commonly, once the mound 200 has been formed, a flexible cover 208 is applied to the surface of the mound, thereby protecting the granular material from the elements, as shown in FIG. 7. Further, because the most common location for deterioration of the granular material is at the perimeter of the mound, it is common to provide the cover 208 with one or more openings 210 to facilitate air flow from the center of the mound through the perimeter wall and the openings 210 and the cover 208.

The present invention is designed as a component of either a semi-permanent or a temporary grain storage structure. It will be appreciated from the foregoing description that when the storage facility is no longer in use, that the wall sections 10 may be separated from one another and either repositioned or collapsed for storage. Likewise, flexible cover 208 may be collapsed and folded for storage and reuse, and ventilating pipes 104 and blowers 108 may be disconnected for storage and for later use.

Numerous variations thereof may be obvious to those skilled in the art without departing from the present invention, which I claim:

I claim:

1. An apparatus for temporarily storing agricultural products on a surface, comprising:
a plurality of wall sections spaced closely to form a retaining wall, each wall section having at least one support structure and a plurality of overlapping elements, the plurality of overlapping elements having a generally J-shaped cross-section with an overlap section, a center section, an upper section, an upper exterior section, and an upper perforated section having a plurality of perforations, the upper exterior section being perpendicular to the upper perforated section, the upper perforated section being perpendicular to the upper section, the center section angles away from the upper section, the overlap section angles away from the center section and is substantially parallel to the upper exterior section, and the upper section being mounted flush to the at least one support structure, wherein the at least one support structure further comprises:
a base that is engageable with the surface;
a back support connected to the plurality of overlapping elements;
a brace connecting the base and the back support in a substantially triangular formation; and
a predetermined angle between the back support and base, wherein the predetermined angle is the angle of repose of the temporarily stored agricultural products.

2. The apparatus of claim 1, wherein the upper perforated section extends away from the at least one support structure.

3. The apparatus of claim 1, wherein the retaining wall formed by the plurality of wall sections has a circular shape.

4. The apparatus of claim 1, wherein the retaining wall formed by the plurality of wall sections has a rectangular shape.

5. The apparatus of claim 1, wherein the total area of the plurality of perforations in the upper perforated section equals between 12% and 13% of the total area of the upper perforated section.

6. The apparatus of claim 1, wherein each perforation has a diameter of substantially 0.75 inches.

* * * * *